United States Patent Office 3,223,180
Patented Dec. 14, 1965

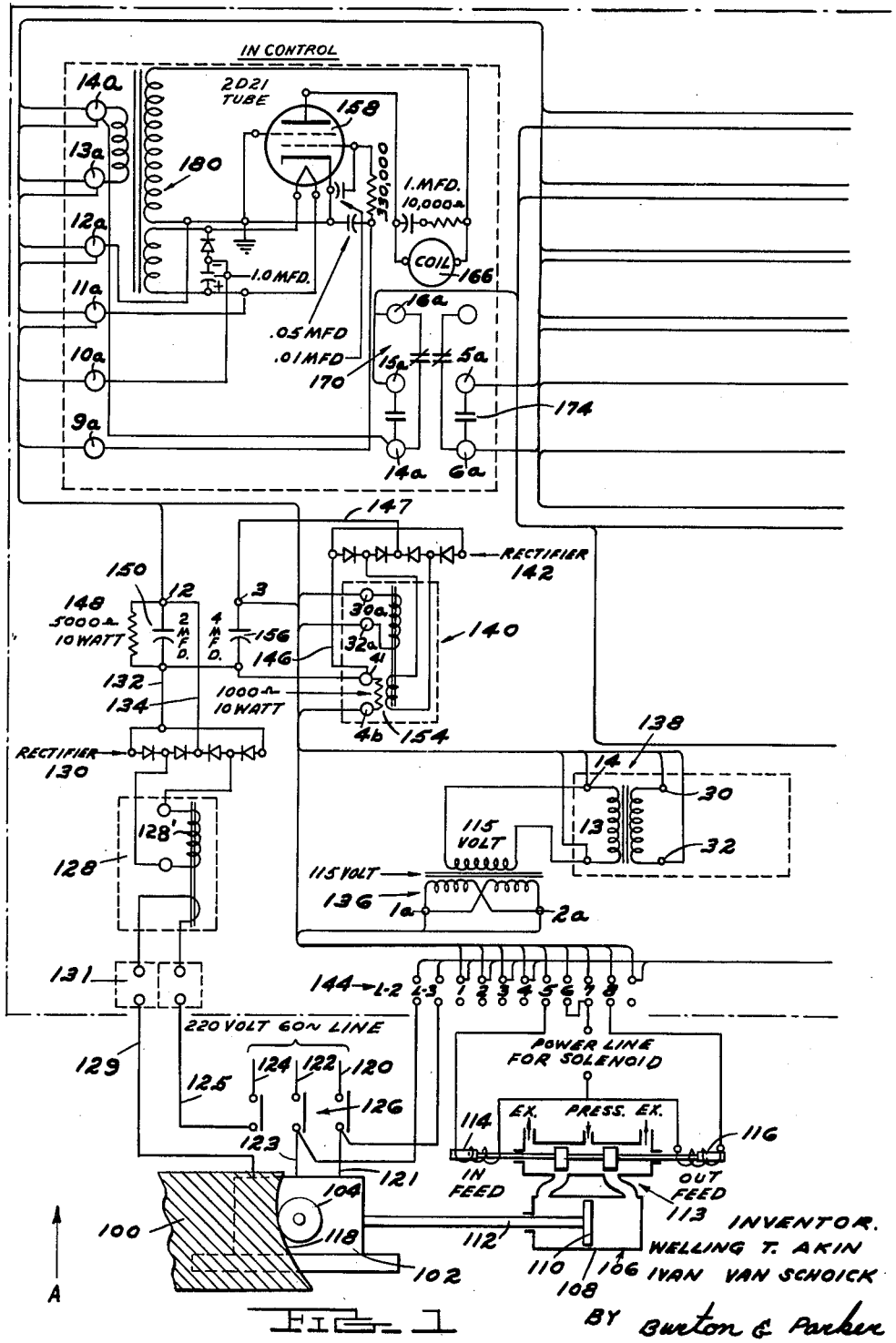

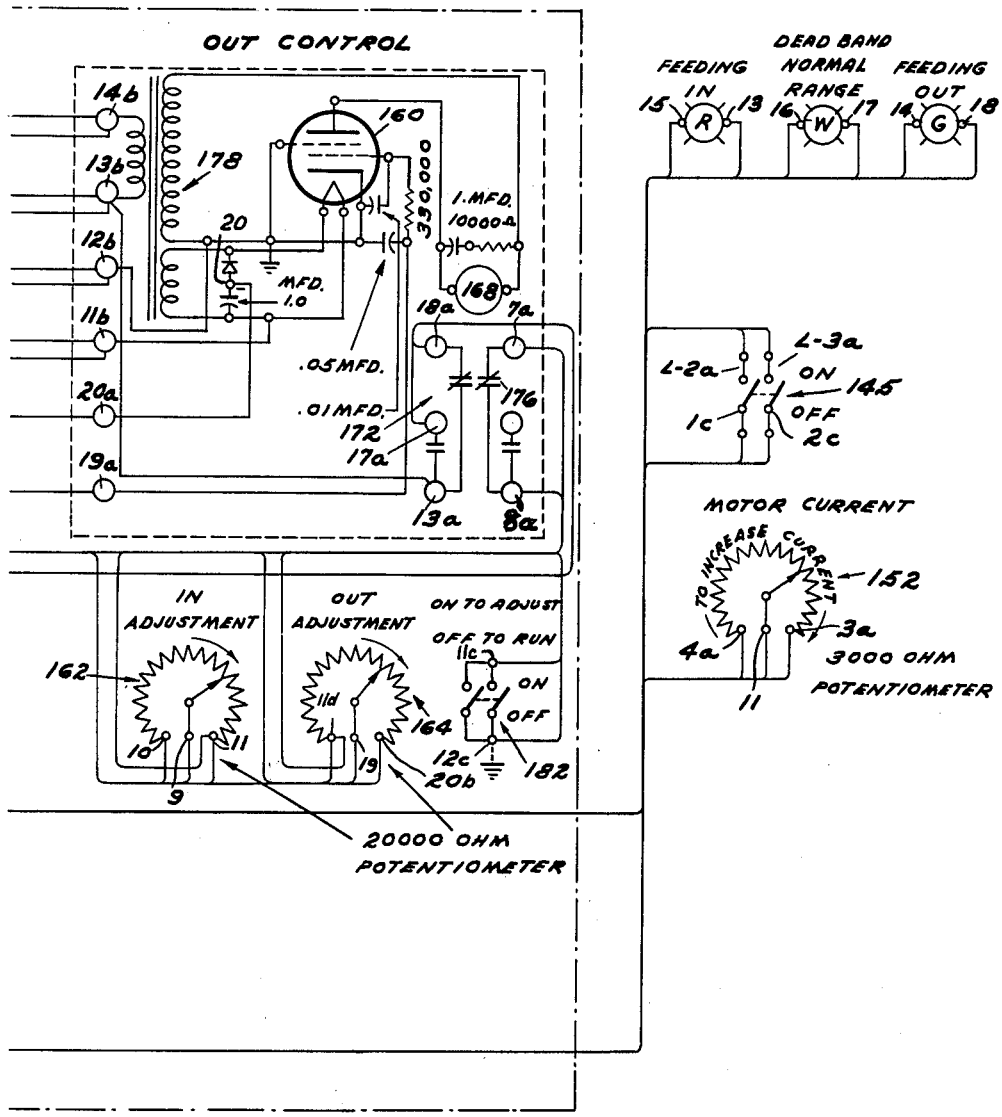

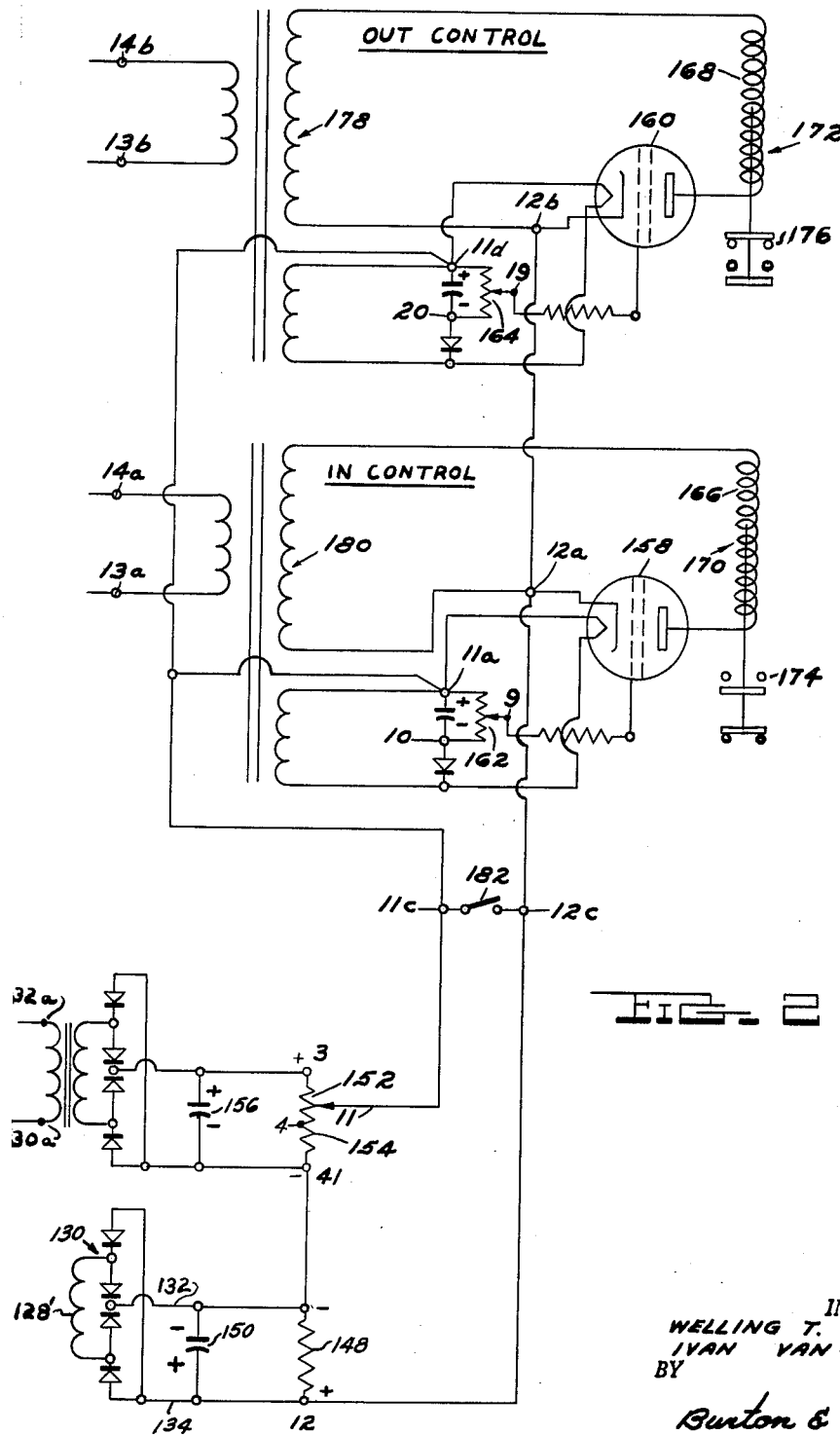

3,223,180
AUTOMATIC WORK PRESSURE CONTROL
SYSTEM
Welling T. Akin and Ivan Van Schoick, Birmingham, Mich., assignors to The B/W Controller Corporation, Birmingham, Mich., a corporation of Michigan
Filed Aug. 7, 1961, Ser. No. 139,564
6 Claims. (Cl. 173—7)

This invention relates to automatic controls for machine tools and particularly to a control which will maintain within readily adjustable limits the working pressure between the workpiece and the tool.

In many machining operations it is desirable to maintain a given working pressure between the tool and the workpiece upon which the tool is acting. Heretofore various devices have been constructed in the attempt to automatically control the operation of a machine tool to maintain a given working pressure but none of these have attained a degree of sensitivity, reliability, universality of application and economical cost frequently desirable or necessary. Some have been responsive to the reacting force of the motor driving the tool and have usually involved spring balanced masses, as a result of which the vibrations in the machine coupled with the inherent natural vibrations of the spring masses have adversely affected the sensitivity. Such devices have required costly modifications of the machine tools and have had to be designed and built especially for each application, and have had a relatively small work pressure operating range.

In other prior devices a form of meter relay has been used, wired into the motor leads, and in which the position of the "pointer" has triggered a circuit for adjusting the tool relative to the workpiece. These devices, however, have an inherent and undesirable time lag between the sensing of the current variations as a result of the varying load on the tool and the operation of the control to vary the position of the tool relative to the workpiece.

In the present control system difficulties of the prior devices have been overcome and a number of positive advantages attained. It serves to accurately control the working pressure and its accuracy or sensitivity is not influenced by vibration of the machine or workpiece. It can be readily attached to any machine tool in which either the tool or the workpiece is driven by a rotary electric motor to effect the cutting operation and in which either the tool or workpiece is moved "in or out" to vary the working pressure by mechanism controllable by the energization or electric devices, such as electro-hydraulic, electro-pneumatic, or electro-mechanical devices. For example, the control may be used with an automatic grinding machine in which the grinding wheel or abrasive belt is driven by an electric motor with the wheel or abrasive belt being shifted toward and away from the workpiece by a carriage or "billy roll" whose movement is controlled by a fluid pressure circuit under the direction of solenoid operated fluid pressure valves. When one of these solenoid valves is energized the carriage is traversed inwardly to increase the working pressure between the tool and workpiece and when another solenoid valve is energized the carriage is traversed outwardly to relieve the working pressure.

Other advantages of the control system include the following. The actual cutting operation performed by the tool can be enclosed as the control system does not require any connection with the machine tool that would prevent the cutting operation being so covered. The control system is readily adjustable thereby providing a flexibility in operation not available in other controls. It can be furnished with pilot lights to show the status of the cutting operations. As a result of the use of this control manual machining may be eliminated and one man permitted to oversee the operations of a number of machines. The maintenance of proper work pressure on a machine tool will prolong the life of the tool and keep maintenance shutdowns to a minimum. The control system may be adjusted to provide a pre-set work pressure and if the working pressure between the tool and workpiece falls either below or above the pre-set pressure the tool is automatically adjusted accordingly to bring the working pressure into agreement with the pre-set pressure. Furthermore, the control system may be readily adjusted to vary the amount by which the working pressure is allowed to deviate from the pre-set pressure before corrective action is taken to alter the working pressure, thereby providing a flexibility in operation not available in other controls.

While we have illustrated the control system coupled with a grinder it is to be understood that the system may be coupled with any machine tool in which it is desired to maintain a given working pressure between the cutting tool and a workpiece and where either one or the other is driven by a rotary electric motor to effect the cutting operation, and in which either the cutting tool or the workpiece is also shifted toward and away from the other by means either subject to, or capable of being subject to electrical control to vary the working pressure. Therefore the control system may be used with automatic drilling machines in which the drill pressure is to be kept constant, milling machines in which the pressure between the milling cutter and the workpiece is to be kept constant, or in a variety of other applications. The system is of particular utility in grinding operations where it is merely desired to traverse across a face of a workpiece with a grinding wheel or abrasive belt maintaining the same contour of the face but smoothing it, as by uniformly removing a few thousandths of an inch of material from the face.

A primary object of the invention is the provision of a work pressure control system which may be readily connected to a machine tool, may be easily manually adjusted to determine the working pressure between the tool and workpiece, and which is of economical and foolproof construction.

Another object of the invention is the provision of a work pressure control system which is connected to the motor leads of the motor driving the cutting tool in the machine tool assembly to sense variations in the current to the motor arising from variations in the working pressure and which converts such current variations into a varying voltage proportional to the current variations and compares the varying voltage with a pre-set or pre-selected voltage and causes the machine tool to increase or decrease the working pressure as a function of the variation of the variable voltage from the pre-set or pre-determined voltage.

The control system's operation is based upon sensing changes in the current to the motor driving the tool and if the current rises beyond a certain point, thereby indicating that the tool has begun to bite more deeply into the workpiece, then the control backs the tool away from the workpiece to reduce the working pressure. If the motor current on the other hand drops below a determined point then the tool is moved toward the workpiece to increase the working pressure and the amount of bite. The range of working pressure variation during which the control will not alter the relative "in or out" position of the tool is hereinafter referred to as the "deadband" range and may be adjusted as later described so that the control may be made as sensitive as desired to variations in working pressure.

FIGS. 1 and 1A show schematically a wired control panel and components thereof embodying the invention, with the system connected to a machine tool; and FIG. 2 is a schematic wiring diagram of a portion of the system of FIGS. 1 and 1A useful in illustrating the manner in which the system functions.

In FIG. 1 a schematic representation of a workpiece is indicated at 100 upon which the machine tool to be controlled by the control system operates to effect some machining function. For example, the machine tool may be a grinder, as shown, having a grinder head including an electric motor 102 rotatably driving a grinding wheel 104. The grinder head and wheel carried thereby are shifted toward and away from the workpiece by any suitable mechanism that may be responsive to electric control such as, for example, a solenoid valve controlled fluid pressure motor 106 comprising a cylinder 108 and cooperating piston 110 coupled by a connecting rod 112 to the grinder head. Movement of the piston is controlled by suitable valving shown as comprising a self-centering spool valve 113 having a solenoid 114 which upon energization shifts the valve spindle to the right to cause fluid pressure to enter the right hand end of cylinder 108 to shift the grinding wheel toward the workpiece, with another solenoid 116 coupled to the other end of the valve spindle and which upon energization serves to shift the valve spindle to the left to admit fluid pressure to the left end of cylinder 108 and cause the grinding wheel to move away from the workpiece. The valve is spring-centered such that when the solenoids are deenergized the valve spindle shifts to a position blocking the valve ports thereby preventing movement of the grinding wheel toward or away from the workpiece. Of course the valve 113 is connected to inlet and exhaust lines of a fluid pressure system as indicated in the drawing.

The face of the workpiece to be machined is indicated at 118. Either the workpiece or the tool, and in the illustrative embodiment it shall be considered the workpiece, is shifted (by mechanism not shown) such that the tool traverses the face 118 either vertically, horizontally, or both. Movement of the tool toward or away from the workpiece by motor 106 will vary the working pressure therebetween. If it be asumed that face 118 is of varying contour as shown in FIG. 1 and the workpiece is moved along a rectilinear path in the direction of Arrow A, then the wheel 104 will follow the contour of face 118 moving in and out as necessary with the working pressure between the face 118 and the wheel being kept substantially constant by the control system, and the tool serving to grind away a substantially constant depth of material across the face of the workpiece while maintaining the original contour of the face.

The system includes means for sensing variation in the current to the motor 102 driving the wheel 104 and translating this current variaation to a voltage which varies with the current. Other means in the system are manually pre-set to determine the mean working pressure between the wheel and face 118 of the workpiece and the amount by which the working pressure may vary above or below such mean (the deadband range) before corrective action is taken to reposition the wheel.

It is of course fundamental to the operation of the system that as the working pressure increases there will be a tendency to slow the rotation of the wheel 104 and in consequence a slowing of the rotation of the armature in the motor 102. According to well understood principles of electric motor operation, as the armature is slowed while the voltage impressed across the motor windings is constant, the current through the motor increases and conversely, as the armature speed increases the current decreases. Therefore by sensing changes in the current to motor 102 the working pressure between the tool and workpiece may also be sensed as a function of the current variation. This phenomenon is utilized in coupling the control system to the machine tool and in controlling the tool.

It is also a recognized phenomenon in alternating current circuits that current and voltage are related in such fashion that by sensing one, a relative measure of the other may also be obtained. This principle is utilized in the instant control system for instead, as in the prior art, of attempting to measure the working pressure and control such pressure as a result of directly measuring current variation by devices themselves sensitive to current variation and which devices would themselves thereupon institute some electro-mechanical movement to take corrective action, we have found that by translating in the first instance the current variation in the motor into a voltage which varies as the current, and in this illustrative embodiment such voltage varies directly as the current, and thereafter basing the operation of the system upon voltage variation, we can attain a degree of sensitivity to variation in working pressure and a speed of response to such variation which far exceeds the sensitivity and response of the prior art systems. As a result of relying upon voltage variation we can sense very slight amounts of voltage variation indicating correspondingly slight amounts of working pressure variation and take corrective action. The prior art devices relying wholly upon current variation were not and, because of their inherent design requirements, could not be as sensitive and quickly responsive to take corrective action.

Referring to FIGS. 1 and 1A, the motor 102 driving the grinder wheel 104 is fed by a 3-wire power circuit having leads 120, 122 and 124 entering a power switch 126 from which the motor is directly fed by lines 121 and 123. A third lead 125 runs to terminal block 131 and another lead 129 runs from the block to the motor 102. The means for sensing the current to the motor and translating it to a voltage varying directly with the motor current is connected in series with the motor specifically in leads 125 and 129 through the terminal block 131. Such means comprises a current transformer 128 and a full wave rectifier 130; the primary winding of the transformer being serially connected in motor leads 125 and 129 by the block 131, and the secondary winding being connected to the rectifier. The voltage output of the rectifier appearing across leads 132 and 134 will be directly proportional to the current variations to the motor. This voltage may be considered for the moment as the working pressure voltage.

A terminal strip is provided at 144 to facilitate connection of various lead wires. The strip contains two parallel rows of binding posts with vertically opposed posts being electrically connected together. Posts $L_2$ and $L_3$ are fed power by leads tapped into leads 121 and 123. A manually operable switch 145 serves to connect terminals L–2 and L–3 respectively with terminal 1 and 2 as shown in FIGS. 1 and 1A. (To facilitate understanding of the panel wiring diagram of FIGS. 1 and 1A, whenever similar reference numerals appear indicating more than one lead wire junction or binding post, such reference numerals differing only by alphabetical subscripts, it is to be understood that such junctions or posts are connected together by a lead wire and are at the same voltage.)

Other means are provided for furnishing a fixed voltage with respect to which the working pressure voltage is to be compared. Such means comprise transformers 136, 138 and 140 and a full wave rectifier 142 connected to the line voltage of L–2 and L–3 at posts 1 and 2. Transformer 136 has its binding posts $1_a$ and $2_a$ of the primary winding connected to the terminal strip 144 at posts 1 and 2. The secondary winding of transformer 136 is fed to the binding posts 13 and 14 of the primary of a constant voltage transformer 138. The posts 30 and 32 of the secondary of transformer 138 are connected respectively to posts $30_a$ and $32_a$ of the primary winding of transformer 140, the secondary of the latter being connected to the full wave rectifier 142 as shown. The output voltage of the rectifier across leads 147 and 146 may, for the moment, be considered as the fixed voltage with respect to which the working pressure voltage is to be compared.

Means connected to the infeed-outfeed mechanism (motor 106 and associated valve mechanism) are provided for comparing the working pressure voltage and the fixed voltage and for instituting corrective action in the "in or out" position of the machine tool. Such means comprise voltage comparator means and "in control means" and "out control means." The comparator means includes a pair of time discharge circuits each connected to the output voltage of one of the rectifiers with the circuits so connected together than when the working pressure voltage either exceeds or is less than the fixed voltage the differential is applied to the control grids of a pair of electron tubes, one of which is in the "in control means" and the other of which is in the "out control means" to vary the bias of the grids. The control grid of the tube in the "in control means" is normally negatively biased sufficiently so that the tube is substantially non-conductive, while the bias of the control grid of the tube of the "out control means" is sufficiently positively biased that the tube is normally conductive. When the working pressure voltage exceeds the fixed voltage the negative voltage output of the comparator adds to the negative bias of the conductive tube and prevents further conduction thereby de-energizing a relay in the tube's plate circuit which in turn initiates operation of the outfeed solenoid 116 of the "infeed-outfeed mechanism" to cause the tool to be retracted to reduce the working pressure. On the other hand should the working pressure drop below the fixed voltage (indicating a reduced working pressure) a positive voltage output of the comparator overrides the negative bias of the non-conductive tube in the "in control means" to make the tube conductive thereby energizing a relay in the tube's plate circuit which in turn initiates operation of the infeed solenoid 114 of the "infeed-outfeed mechanism" to cause the tool to be moved toward the workpiece to increase the working pressure. In the "in control means" and in the "out control means" adjustments may be made to determine the amount by which the variable voltage must exceed or fall short of the fixed voltage before the tubes are made either conductive or non-conductive as above mentioned. In this way the deadband width of the control system may be varied, or in other words, the amount of variation in working pressure that the control system will allow before taking corrective action. The comparator means includes manually adjustable means to vary the fixed voltage and thereby the working pressure voltage and in turn the working pressure.

In the following discussion reference should be made to FIG. 2 as well as FIGS. 1 and 1A. The time discharge circuit for the working pressure voltage includes a parallel connected resistor 148 and capacitor 150 connected across the working pressure voltage appearing in leads 132 and 134. The time discharge circuit for the fixed voltage comprises parallel connected resistance and capacitance, the resistance arm including a pair of resistances 152 and 154 serially connected at 4 (see FIG. 2), and the capacitance arm including a capacitor 156. Resistor 152 is in the form of a potentiometer having a variable position contact 11.

As will be noted from FIG. 2, the negative ends of the resistance branches of the time discharge circuits are connected together. The positive end 12 of the resistor 148 is connected to the cathodes of each tube 158 and 160, while the movable contact 11 is connected to the control grids through bias adjustment potentiometers 162 and 164, one for each tube. In series with the plate circuits of the tubes are the coils 166 and 168 of relays 170 and 172. In relay 170 normally open contacts 174 when closed serve to energize solenoid 114 of the feed mechanism (motor 106 and associated valve mechanism). In relay 172 normally closed contacts 176 when closed serve to energize solenoid 116 of the feed mechanism. Lamps R and G are suitably connected as shown to the relays to be lighted respectively when solenoid 114 or 116 is energized.

Each of the tubes will conduct only on the positive half cycles of the output of the respective power supplies 178 and 180, and then, of course, only when the control grid bias is sufficiently positive.

Preparatory to operation of the control system, and assuming the switches 126 and 145 are closed and the tool 104 is clear of the workpiece, the toggle switch 182 is closed shorting the cathodes of both tubes to both control grids through the potentiometer 162 and 164. The "in control" potentiometer 162 is adjusted so that the movable contact is at the negative end of the resistance, which will make tube 158 non-conducting to de-energize the coil of relay 170. Then the "out control" potentiometer 164 is adjusted until the tube 160 is not conducting, at which time lamp G will be illuminated. Then potentiometer 164 is turned in the opposite direction until tube 160 is just barely conducting enough current in the plate circuit to actuate the relay 172. This point will be evidenced by lamp G going out. The "in control" potentiometer is then adjusted until tube 158 is conducting, as evidenced by illumination of lamp R. Then this potentiometer is turned in the opposite direction until tube 158 just barely ceases conducting enough current in the plate circuit of tube 158 to actuate relay 170, which will be indicated by lamp R going out. At this point the control provides the minimum width of deadband and greatest sensitivity is set in the control system. Such a setting may sometimes not be satisfactory as the control system may tend to "hunt" moving the tool in and out in an uncertain fashion. Therefore each potentiometer may be turned slightly farther thereby slightly increasing the deadband width. In this fashion the deadband width may be readily varied.

The toggle switch 182 is now opened and the motor control potentiometer 152 adjusted to bring the tool into contact with the workpiece and determine the working pressure desired. With the tool now in contact with the workpiece the control will serve to maintain a constant working pressure. If the working pressure voltage now impressed across resistor 148 and capacitor 150, and hereinafter referred to as the load voltage, exceeds the fixed voltage between the potentiometer contact 11 and the negative side of the potentiometers 152 and 154, then the control grids of both tubes are made more negative and the tube that was conducting, the "out control" tube 160, will stop conducting, thereby de-energizing relay 172 and closing contacts 176 to energize solenoid 116 to move the tool 104 away from the workpiece to reduce the working pressure. When, on the other hand, the load voltage is exceeded by the fixed voltage, then the polarity of the output circuit of the comparing means, which polarity may be readily noted across terminals 11$_c$ and 12$_c$, will be reversed such that the control grids of the tubes are made more positive, which while not affecting tube 160, will cause tube 158 to become conductive, whereupon the coil of relay 170 will be energized closing contacts 174 and causing solenoid 114 to be energized to cause the tool 104 to increase the working pressure.

It has been found experimentally that in a motor whose normal load current is 44 amperes, a 1 ampere change in this current as a result of working pressure variation may be readily sensed by the control and corrective action effected either to increase or decrease the working pressure. It will be observed that the sensitivity of the control system is in effect regulated by adjusting the normal bias on the control grids of the tubes.

It will be noted that in the event of a tube or voltage failure that the solenoid 116 would be energized to retract the tool away from the workpiece.

What we claim is:

1. A system for controlling the working pressure between a workpiece and a tool, one of which is driven by an electric motor whose current varies as the working pressure and one of which is shiftable by feed mechanism toward and away from the other to vary the working pressure therebetween, comprising, in combination: first means for sensing variations in the current of the motor and providing an output voltage fluctuating with the current variations, second means for providing a fixed output voltage, comparing means connected to the output voltages of the first and second means and having an output circuit providing an output voltage whose magnitude and polarity varies as a function of the difference between the fixed and variable voltages of the first and second means, feed mechanism control means coupled to the output circuit of the comparing means and adapted to be connected to the feed mechanism and having a pair of circuits, one for instituting operation of the feed mechanism to increase the working pressure and one for instituting operation of the feed mechanism to decrease the working pressure, said circuits of the feed mechanism control means each including energizing means responsive to a determined polarity and magnitude of voltage from the comparing means to energize or de-energize the respective circuits, and said circuit of the feed mechanism control means for instituting operation of the feed mechanism to decrease the working pressure includes means responsive to a failure of said energizing means to cause operation of the feed mechanism to relieve the working pressure.

2. A system for controlling the working pressure between a workpiece and a tool, one of which is driven by an electric motor whose current varies as the working pressure and one of which is shiftable by reversible feed means toward or away from the other to maintain a preselected working pressure, comprising: first means for sensing variations in the motor current and generating a D.C. output voltage fluctuating directly proportional to the current fluctuations throughout the running current range of the motor, second means for providing a preselected D.C. reference voltage, and means coupled with the first and second means and adapted to be coupled with the feeding means and including circuits responsive to the generated D.C. voltage from such first means exceeding the D.C. reference voltage of the second means to cause said feeding means to reverse the direction of feed to maintain a constant relationship between the generated D.C. voltage and the reference voltage thereby maintaining substantially constant working pressure between the tool and workpiece, and responsive to the generating D.C. voltage of the first means being less than the D.C. reference voltage of the second means to cause said feeding means to again reverse the direction of feed to maintain a constant relationship between the generated D.C. voltage and the reference voltage thereby maintaining substantially constant the working pressure between the tool and workpiece.

3. The invention as defined in claim 2 characterized in that the last mentioned means includes a portion shiftable to vary the sensitivity of response to the generated voltage from said first means deviating from the reference voltage of said second means.

4. The invention as defined by claim 3 characterized in that said second means includes a part shiftable to vary the reference voltage and thusly the working pressure between the tool and workpiece.

5. A system for controlling the working pressure between a workpiece and a tool, one of which is driven by an electric motor whose current varies as the working pressure and one of which is shiftable by feed mechanism toward and away from the other to maintain substantially constant the working pressure therebetween, comprising, in combination: first means for sensing variations in the electric current of the motor and providing a D.C. output voltage fluctuating directly proportional to the current variations throughout the running current range of the motor, second means for providing a fixed D.C. output voltage, comparing means connected to the D.C. output voltages of the first and second means and having an output circuit providing a D.C. output voltage whose polarity varies as the fluctuating D.C. voltage exceeds or falls below the fixed D.C. voltage and whose magnitude varies as the amount by which the fluctuating D.C. voltage differs from the fixed D.C. voltage, and feed mechanism control means coupled to the output circuit of the comparing means and adapted to be connected to the feed mechanism and responsive to a determined polarity and voltage difference between the fixed and variable D.C. voltages to cause variation and reversal of the feed mechanism to maintain substantially constant the working pressure between the tool and workpiece.

6. A system for controlling the working pressure between a workpiece and a tool, one of which is driven by an electric motor whose electric current varies as the working pressure and one of which is shiftable by feed mechanism toward and away from the other to maintain substantially constant the working pressure therebetween, comprising, in combination: first means for sensing variations in the electric current of the motor and providing a D.C. output voltage fluctuating directly proportional to the current variations throughout the running current range of the motor, second means for providing a fixed D.C. output voltage, comparing means connected to the output voltages of the first and second means and having an output circuit providing a D.C. output voltage having characteristics varying as a function of the difference between the fixed and variable voltages of the first and second means, and feed mechanism control means coupled to the output circuit of the comparing means and adapted to be connected to the feed mechanism and having circuits responsive to determined characteristics of the output voltage of the comparing means to cause said feed mechanism to vary or reverse its feed to maintain substantially constant the working pressure.

References Cited by the Examiner

UNITED STATES PATENTS 1,871,750  8/1932  Shaw _____ 318—39
2,331,123  10/1943  Leigh _____ 318—433

BROUGHTON G. DURHAM, *Primary Examiner.*

ORIS L. RADER, *Examiner.*